(12) United States Patent (10) Patent No.: US 12,641,015 B2

Krentsel et al. (45) Date of Patent: May 26, 2026

(54) ENCODING SOURCE ROUTES USING MPLS SUB-LABELS

(71) Applicant: Google LLC, Mountain View, CA (US)

(72) Inventors: Alexander Krentsel, Berkeley, CA (US); Ashok Narayanan, Lexington, MA (US); Sylvia Ratnasamy, Berkeley, CA (US); Robert Shakir, San Francisco, CA (US)

(73) Assignee: Google LLC, Mountain View, CA (US)

( * ) Notice: Subject to any disclaimer, the term of this patent is extended or adjusted under 35 U.S.C. 154(b) by 503 days.

(21) Appl. No.: 18/109,679

(22) Filed: Feb. 14, 2023

(65) Prior Publication Data

US 2024/0297845 A1     Sep. 5, 2024

(51) Int. Cl.
*H04L 45/50* (2022.01)
*H04L 45/00* (2022.01)

(52) U.S. Cl.
CPC ............ *H04L 45/507* (2013.01); *H04L 45/34* (2013.01)

(58) Field of Classification Search
None
See application file for complete search history.

(56) References Cited

U.S. PATENT DOCUMENTS

| | | | | |
|---|---|---|---|---|
| 8,976,682 B2 * | 3/2015 | Boutros | ................... | H04L 41/06 |
| | | | | 370/248 |
| 10,218,610 B2 * | 2/2019 | Frost | ........................ | H04L 45/44 |
| 10,404,600 B2 * | 9/2019 | Shakir | ................... | H04L 47/125 |

| | | | | |
|---|---|---|---|---|
| 10,924,389 B2 * | 2/2021 | Ceccarelli | ............... | H04L 45/50 |
| 10,965,590 B2 * | 3/2021 | Xu | ........................ | H04L 12/6418 |
| 11,201,820 B2 * | 12/2021 | Song | ........................ | H04L 45/34 |
| 2013/0336324 A1 * | 12/2013 | Solomon | ................ | H04L 45/74 |
| | | | | 370/392 |
| 2015/0207736 A1 * | 7/2015 | Roch | ........................ | H04L 45/34 |
| | | | | 370/393 |
| 2020/0358698 A1 * | 11/2020 | Song | ........................ | H04L 45/50 |
| 2021/0021513 A1 * | 1/2021 | Filsfils | ................... | H04L 45/741 |
| 2023/0028147 A1 * | 1/2023 | Dutta | ........................ | H04L 45/34 |

(Continued)

FOREIGN PATENT DOCUMENTS

WO          2021011392 A1     1/2021

OTHER PUBLICATIONS

Ridwan, et al. Recent trends in MPLS networks: technologies, applications and challenges. The Institution of Engineering and Technology Journals. 2020, vol. 14 Iss. 2, pp. 117-185, 9 pages Published Dec. 13, 2019.

(Continued)

*Primary Examiner* — Luat Phung
(74) *Attorney, Agent, or Firm* — Lerner David LLP

(57) ABSTRACT

Generally disclosed herein is an approach for modifying use of segment routing multiprotocol label switching (SR-MPLS) allowing an arbitrary MPLS control plane and traditional MPLS data plane to utilize a single MPLS label to represent two or more edges in a path. MPLS labels may be divided into smaller sub-labels, which together uniquely represent a pair of edges along a route. In one example, a single MPLS label may be divided into two sub-labels, the first sub-label representing a first edge, and the second sub-label representing a second edge. In this regard, longer source routes may be supported in a packet header in network designs that implement strict source routing.

18 Claims, 7 Drawing Sheets

(56)  References Cited

U.S. PATENT DOCUMENTS

2023/0103816 A1*  4/2023  Trujillo .............. H04L 41/0895
                                                    370/328
2023/0370358 A1*  11/2023  Song ...................... H04L 45/50
2024/0235994 A1*  7/2024  He ........................ H04L 45/566

OTHER PUBLICATIONS

Hesselbach, et al. Hashing based traffic partitioning in a multicast-multipath MPLS network model. Retrieved on Jan. 6, 2023 7 Pages.
Extended European Search Report for European Patent Application No. 23191839.2 dated Dec. 15, 2023. 10 pages.

* cited by examiner

400

| MPLS Label | Action | Outgoing Interface |
|---|---|---|
| DE | pop_label | interface D->E |
| EG | keep_label | interface D->E |
| EØ | pop_label | interface D->E |
| DC | pop_label | interface D->C |
| CØ | pop_label | interface D->C |
| DB | pop_label | interface D->B |
| BA | keep_label | interface D->B |
| BØ | pop_label | interface D->B |

FIG. 4

MPLS labels are generated by a router.

702

Split the MPLS label into two sublabels

704

Look up  a routing table.

706

Transmit the packet to the destination node.

708

ENCODING SOURCE ROUTES USING MPLS SUB-LABELS

BACKGROUND

In a communication network, source routing may refer to an approach to packet forwarding in which the packet header encodes the network path. Typically, the packet header encoding is implemented by an ingress router placing the source route in the packet's headers. Subsequent routers may then forward the packets based on the source route. One approach may be to represent a source route using a stack of multiprotocol label switching (MPLS) headers, with each MPLS header being 4 bytes long and including 20 bits for an MPLS label and 12 bits for bookkeeping or other functions. Due to limitations in network switching hardware, the number of the MPLS labels that may be added to a single packet may be limited. Moreover, the length of the network path that can be encoded to the packet header may also be limited. Thus, for a scaled-up network that contains longer paths that each packet may need to traverse, using a single MPLS label to indicate each element in the path may not be practical. Complex workarounds may include implementing a loose source routing in which the source route only specifies a subset of the routers along the path and a different routing technique is used to forward packets between the subsets of the routers. This approach, however, does not implement strict source routing.

BRIEF SUMMARY

Generally disclosed herein is a mechanism to support longer source routes in a packet header. An MPLS label may be split into multiple sub-labels. Edges along a route may be represented using the multiple sub-labels. By packing a particular edge identifier into a single MPLS label, strict source routing in networks such as a wide area network (WAN) may be implemented.

An aspect of the disclosure provides a method for encoding source routes using multiprotocol label switching (MPLS) sub-labels. The method includes dividing, by one or more processors, a memory segment of a packet including an MPLS header into at least a first sub-segment and a second sub-segment. The method also includes storing, by the one or more processors, first information for a first edge of a route in the first sub-segment and second information for a second edge of the route in the second sub-segment.

In one example, the method further includes receiving, by the one or more processors, the packet including the MPLS header. The method also includes transmitting, by the one or more processors, the packet from a source node to a destination node based on a combination of the information stored in the first sub-segment and the information stored in the second sub-segment.

In yet another example, the method further includes padding the second sub-segment with zeros when only a subset of the second sub-segment is required.

In yet another example, the method further includes assigning an identifier for each of the one or more edges that is unique from any other edge originating from a node within a N degree of neighbors.

In yet another example, the method further includes distributing a combination of the first information stored in the first sub-segment and the second information stored in the second sub-segment using an intermediate system to intermediate system (IS-IS) protocol.

Another aspect of the disclosure provides for a system comprising one or more processors and memory in communication with the one or more processors, the memory including instructions configured to cause the one or more processors to divide a memory segment of a packet including an MPLS header into at least a first sub-segment and a second sub-segment. The instructions are further configured to cause the one or more processors to store a first information for a first edge of a route in the first sub-segment and second information for a second edge of the route in the second sub-segment.

In one example, the instructions are further configured to cause the one or more processors to receive the packet including the MPLS header and transmit the packet from a source node to a destination node based on a combination of the information stored in the first sub-segment and the information stored in the second sub-segment.

In yet another example, the instructions are further configured to cause the one or more processors to pad the second sub-segment with zeros when only a subset of the second sub-segment is required.

In yet another example, the instructions are further configured to cause the one or more processors to assign an identifier for each of the one or more edges that is unique from any other edge originating from a node within a N degree of neighbors.

In yet another example, the instructions are further configured to cause the one or more processors to distribute the combination of the first information stored in the first sub-segment and the second information stored in the second sub-segment using an intermediate system to intermediate system (IS-IS) protocol.

The above and other aspects of the disclosure can include one or more of the following features. In some examples, aspects of the disclosure provide for all of the following features, in combination.

In an example, the MPLS header is divided into N numbers of sub-segments.

In yet another example, the N numbers of sub-segments store information of N numbers of edges in the route.

In yet another example, the first information and the second information is programmed using an application programming interface (API) with a remote call procedure call (RPC)-based protocol.

In yet another example, each of the first sub-segment and the second sub-segment store 10 bits of information.

In yet another example, each 10-bit sub-labels may encode a link ID as distributed by a link-state protocol.

BRIEF DESCRIPTION OF THE DRAWINGS

FIG. 4 depicts an example MPLS lookup table at a node according to aspects of the disclosure.

DETAILED DESCRIPTION

Figures 1A, 1B:
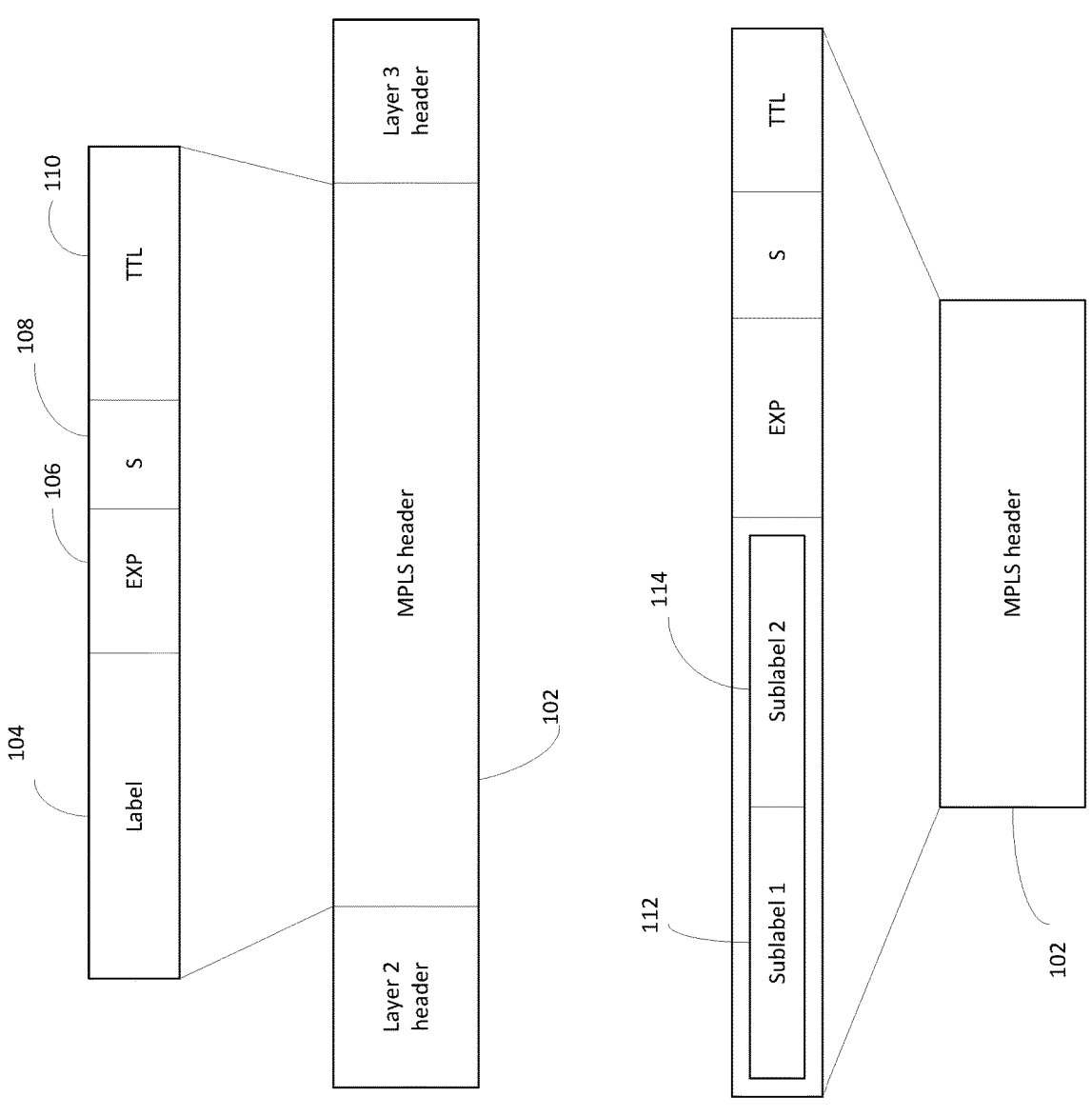
FIGS. 1A-1B depict example MPLS headers according to aspects of the disclosure.

Generally disclosed herein is an approach for modifying use of segment routing multiprotocol label switching (SR-MPLS), allowing an arbitrary MPLS control plane and traditional MPLS data plane to utilize a single MPLS label to represent multiple edges in a path. MPLS labels may be divided into smaller sub-labels, which together uniquely represent a pair or group of edges along a route. For example, a single MPLS label may be divided into multiple sub-labels, the first sub-label representing a first edge, and the second sub-label representing a second edge and so on. In this regard, longer source routes may be supported in a packet header in network designs that implement strict source routing. For example, by using two MPLS sub-labels each representing a different edge, twice as many potential hops may be represented as compared to using a single MPLS header.

According to some examples, a 20-bit MPLS label may be split into two 10-bit sub-labels, which together uniquely represent a pair of edges along a route. Each 10-bit sub-label may encode a link or edge ID as distributed by a link-state protocol. It is to be understood that a link and an edge may mean the same and be used interchangeably herein. The link ID may be assigned by a software-defined networking (SDN) controller, or configured statically during device provisioning. An even-length route containing an even number of nodes may be put into a header with multiple numbers of MPLS labels. For example, if a source route comprises the nodes A-B-C-D, the route may be split into a MPLS label comprising two MPLS sub-labels, each MPLS sub-label representing an edge corresponding to each of A-B and C-D. An odd-length route may be padded with a null label. For example, if a source route comprises A-B-C-D-E, the MPLS labels may split into sub-labels to represent the edges AB, CD, and EØ, where "Ø" is a null sub-label padding the last MPLS label. The null label may be reserved and made up of all 0s. In this regard, "Ø" may be represented by 10 bits of zeros, which is "0000000000".

According to some examples, MPLS labels may be matched using equality comparison technique as opposed to a wild-card matching technique used in a longest prefix match lookup technique. All possible pairs of edges that a router may identify may be enumerated. The router may only identify its neighbors and the edges containing itself. For each MPLS label, the correct egress port and any associated action may be encoded. The associated action may include keeping the MPLS label when forwarding data along the first edge or popping the MPLS label when forwarding along the second edge to reveal the next MPLS label to the next router. The receiving router may then install constructed forwarding entries for the MPLS labels, which may stay static for a given configuration of the network. When programming source rotes, a head-end router may compress the source route into pairs of MPLS sub-labels and program the resultant MPLS sub-labels stack into forwarding tables.

According to some examples, for any given node X, $N_1$ may represent any degree-1 neighbor and $N_2$ may represent any degree-2 neighbor. Ø may be a reserved null zero sequence. For node X, node X's MPLS forwarding table may be made up of entries with full MPLS label keys, associated actions, and interfaces as values. For example, the entries may be as follows:

$$XN_1 \rightarrow (pop\_label, intN_1)$$
$$N_1N_2 \rightarrow (keep\_label, intN_1)$$
$$N_1Ø \rightarrow (pop\_label, intN_1)$$

XN1 may refer to an edge between node X and its degree-1 neighboring node N1. Pop_label function may refer to removing the MPLS label from the packet. "intN1" may refer to an interface at node N1. Node X and node X's degree-2 neighboring node N2 may be connected to node N1. N1N2 may refer to an edge between node N1 and node N2. Keep_label function may refer to swapping the label at the top of the label stack in the MPLS packet for the label indicating the next hop. N1 Ø may refer to the end node N1 indicated by a null value "Ø".

According to some examples, for a network with n number of nodes and average degree k, there may be $k^2+2$ k entries in each MPLS forwarding plane. The number of entries may grow as the average degree k grows, independent of the number of nodes. For example, if the average degree k increases, each node may eventually be connected to every other node in a mesh network topology.

In some examples, a hardware restriction may exist with respect to the number of labels that can be added to the packet header. By way of example, the maximum number of available labels may be 6 MPLS labels per header. In a traditional packet header, this would limit the encoding of strict source paths to 6 hops. By splitting the 6 MPLS labels into 12 sub-labels each using the techniques described herein, a strict source path of up to 12 hops may be encoded in each packet. If hardware is able to support up to 13 MPLS labels, 26 MPLS sub-labels are available for encoding the strict source path, thereby allowing up to 26 strict hops in a path. This may enable scaling up the network significantly and selecting more complicated source paths.

According to some examples, splitting a single MPLS label into multiple MPLS sub-labels may be formulated by using common names of individual edges between nodes distributed in any fashion and a combining function that takes the common names and produces an MPLS label that represents combinations of the common names in a collision-resilient manner. Furthermore, such names may be statically configured on each intermediate node by a network management system.

According to some examples, unique edges may be assigned identifiers to identify the above configure names and the identifier may be communicated to other routers using an intermediate system to intermediate system (IS-IS) protocol or any other link state protocol, or the statically assigned identifiers may be provided to source nodes using an out-of-band communication mechanism. A protocol that distributes the names may include any type of protocol that represents edges in its information.

According to some examples, a concatenate function may be used as a combining function to generate an MPLS label. For example, the function may be described as 'f(L1, L2)=concat(L1, L2)', where the function 'f( )' takes the 10-bit name of a first edge 1 and a 10-bit name of a second edge 2 and concatenate the two 10-bit names to yield a unique MPLS label for the two edges.

In some other examples, the concatenate function may be changed to a hash function and the number of sub-labels may be increased, such as by changing the number of sub-labels to three instead of two. For example, the function may accept the variables L1, L2, L3, where L1, L2, L3 are made up of the tuple {degree1neighbor, degree2neighbor, degree3neighbor, selfID, null}. The function, f (L1, L2, L3) may compute a unique value of an MPLS label for a packet arriving at a node.

According to some examples, adopting the above sub-label function of the form f(L1, L2, L3) allows 3 nodes to be encoded into a single MPLS label, allowing a greater number of path hops to be encoded into a single 20-bit MPLS label. Thus, generalizing the sublabel function to f(L1, . . . LN) may increase the number of hops that can be encoded to N. The limitation on N within a specific network topology may be such that the result of f( . . . ) must result in an unique label value "L" for the neighborhood of N nodes.

According to some examples, MPLS sub-labels may uniquely identify sufficient numbers of nodes that are routed in WAN. For example, if there are approximately 1135 unique nodes that packets are routed through in a network, those nodes may require (1135))=11 bits to uniquely identify all nodes. If only 10 bits of MPLS sub-labels are available for particular network hardware, there may not be sufficient numbers of bits to cover 11 bits. In some examples, the above issue may be cured by relaxing the constraint that MPLS sub-labels need to be globally unique. For example, the constraint may be relaxed by unambiguously picking the next node to send a packet using MPLS sub-labels. A link or edge coloring solution may be implemented by selecting a unique color for each edge that is unique from any other edge originating from either node that the edge is connected to. An optimal edge coloring may require max degree numbers of unique labels, which may be, for example, 106 across the network. If the max degree number of the unique labels is 106, it may require (106))=7 bits to uniquely identify all available edges. In the above example, if 10 bits of MPLS sub-labels are available, 7 bits are sufficiently identifiable using the MPLS sub-labels. The edge coloring solution may be advantageous in most WAN since the above formula requires the number of node degrees, not the diameter or number of nodes in the network. Therefore, the number of the required bits according to the above formula may not grow drastically for most of the network since even if the number of nodes may increase, the additional nodes may be connected to the current nodes, which in turn may increase the number of degrees slowly.

According to some examples, the data plane supporting the MPLS sub-label approach may be realized through different approaches. In some examples, traditional protocols may be extended to program new MPLS sub-labels. Alternatively, an API using a remote procedure call (RPC)-based protocol may be used to program the data plane to support the MPLS sub-labels. Such an API may allow the implementation of MPLS sub-labels without the need for protocol extensions. The API may modify the contents of the MPLS label forwarding information base (LFIB) of the network device. In some examples, MPLS sub-labels may be added as stacks to next-hop forwarding entries at a label edge router. Then, IPv4 or IPv6 routes, or MPLS forwarding entries, may make reference to the corresponding stacks for each destination node. "Next" action and "Continue" action may be instructed via MPLS LFIB operations to pop and swap the MPLS sub-labels.

FIG. 1A depicts an example packet header. MPLS header 102 may be added in between the Layer 2 and Layer 3 headers. MPLS header 102 may be attached to a packet. MPLS header 102 may include fields such as label 104, experimental (EXP) bits 106, stack (s) bit 208, and time-to-live (TTL) bits 110. Label 104 may have a size of 20 bits and may be indexed into an MPLS forwarding table. EXP bits 106 may contain information related to classes of services (CoS) identified for each packet. S bits 108 may contain information related to the bottom-of stack and may be used to assign more than one label to a packet. TTL bits 110 may be used for path tracking. For example, the value in TTL bits may decrease by 1 every time the packet reaches the next node.

FIG. 1B depicts a block diagram of an example MPLS header using sub-labels. MPLS header 102 may include label 104, split into sub-label 112 and 114. According to some examples, sub-label 112 may contain 10 bits of information, and sub-label 114 may also have 10 bits of information. Together, the sub-labels 112 and 114 may uniquely identify a pair of edges in the network. For example, if sub-label 112 has a label representing the node "AB" and sub-label 114 has a label representing node "CD", the combination of the sub-labels representing "AB' and "CD" may represent a pair of edges between the edge "AB" and the edge "CD".

Figure 2A:
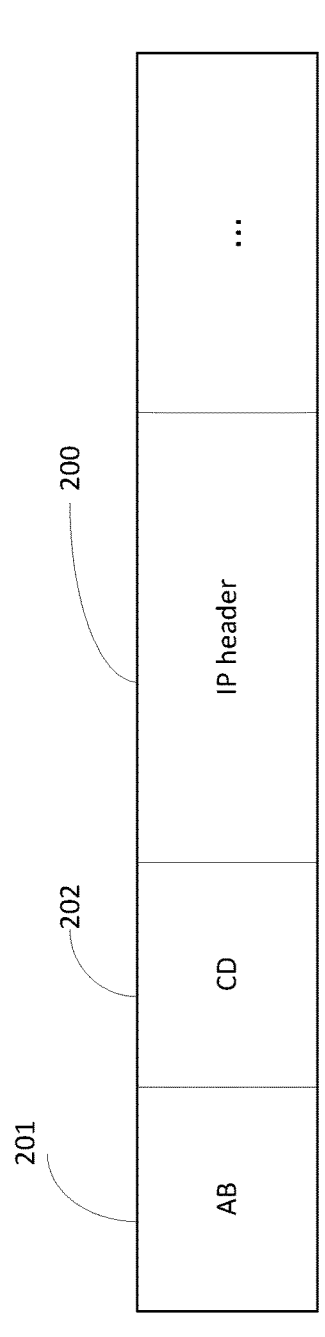
FIGS. 2A-2B depict example MPLS sub-labels according to aspects of the disclosure.

FIG. 2A depicts example MPLS sub-labels associated with 4 nodes. For example, a source route may be A-B-C-D. In this case, MPLS label 201 may include a first sub-label representing an edge "AB" and a second sub-label representing edge "CD".

Figure 2B:
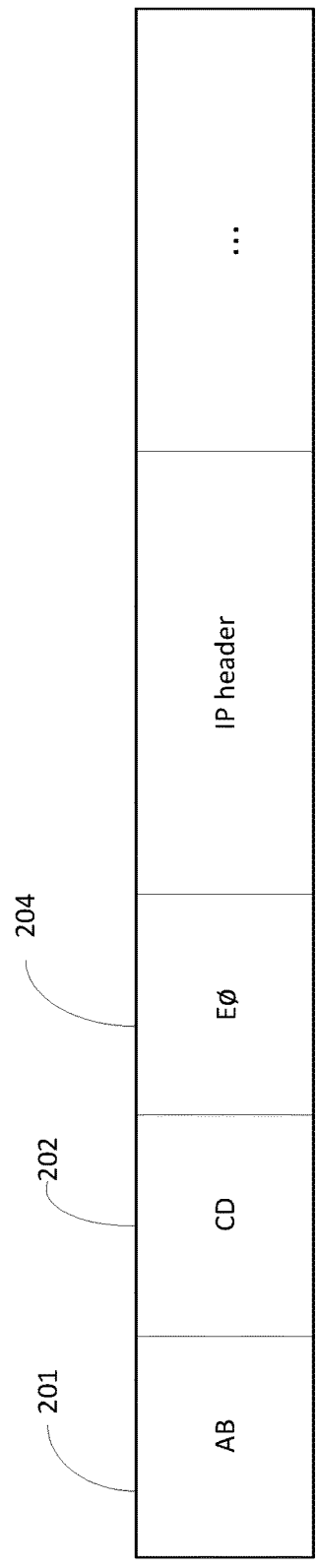

FIG. 2B depicts a block diagram of example MPLS sub-labels associated with an odd number of nodes. For example, a source route may be A-B-C-D-E. In such a case, three MPLS sub-labels may be generated. MPLS sub-labels 201-204 may include the first sub-labels each representing an edge "AB", "CD" and "EØ" respectively and the null value is used to pad the sub-label representing the last node in the source route.

Figure 3:
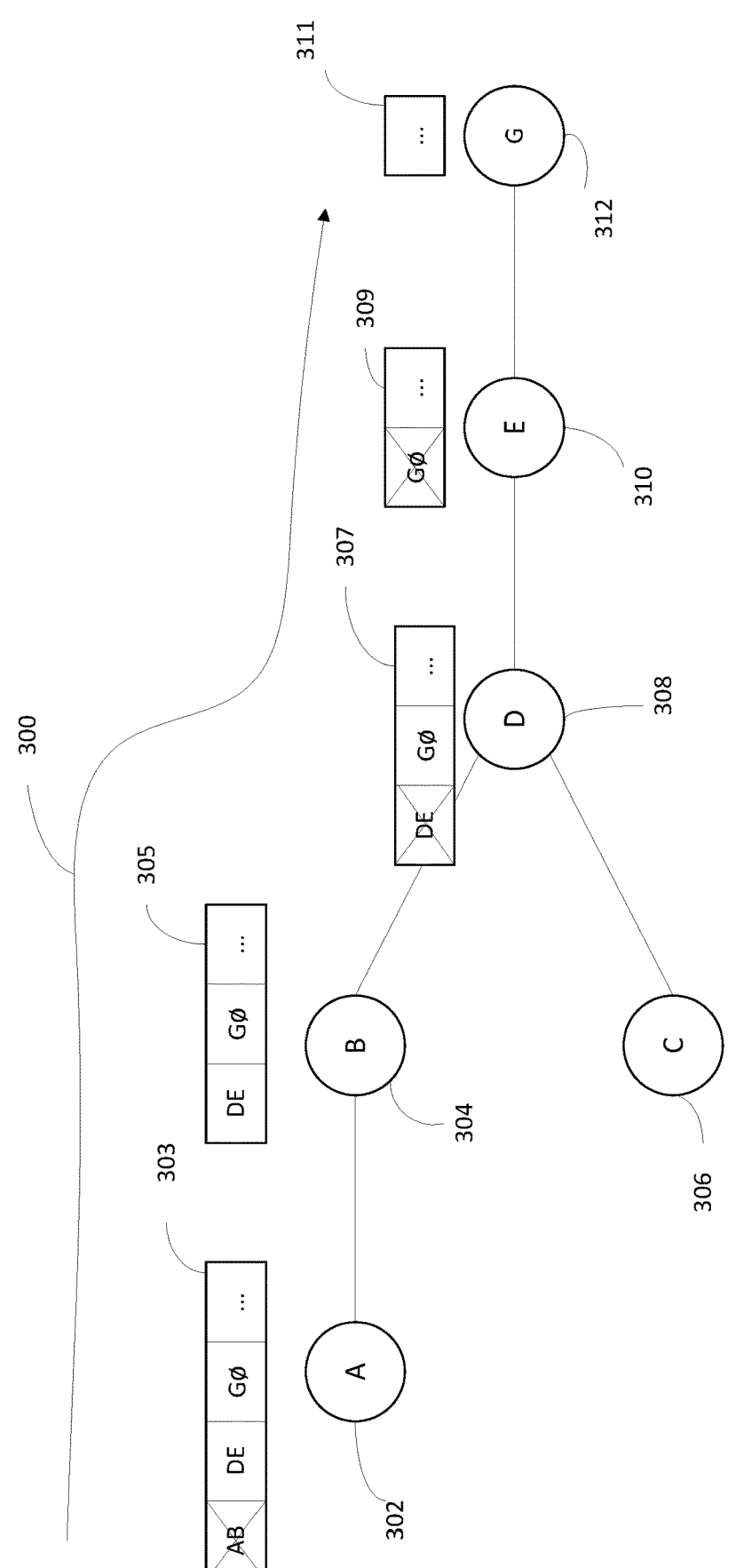
FIG. 3 depicts a diagram of example network topology using MPLS sub-labels according to aspects of the disclosure.

FIG. 3 depicts a block diagram of an example network topology using MPLS sub-labels. Route 300 may include nodes A 302, B 304, D 308, E 310, and G 312. Node C 306 is not included in route 300. Each node A 302, B 304, D 308, E 310, and G 312 may have a respective MPLS forwarding table 303-311 stored in its memory. The MPLS forwarding table 303-311 may be updated based on removing or swapping the previously stored MPLS labels. For example, node A 302 may store table 303. Table 303 may include MPLS sub-labels representing edges "AB", "DE", and "GØ". MPLS sub-label "AB" may be removed at node A 302, such as by using a "pop-label" operation. A "pop-label" operation may refer to an operation which removes the labels representing the edges that a packet has already traversed. Similarly, node B 304 may store table 305 comprising MPLS sub-labels "DE" and "GO". Node D 308 may store table 307 comprising MPLS sub-labels "GØ" with MPLS sub-label "DE" being removed using the "pop_label" operation. Node E 310 may store table 309 including empty MPLS sub-labels with MPLS labels "GO" being removed using the "pop_label" operation. Node G 312 stores table 311 with no entry as node G 312 is the last node in route 300. In this example, as node C 306 is not included in route 300, node C 306 does not need to store a forwarding table for route 300. In other examples, MPLS sub-label AB may be swapped with another label.

FIG. 4 depicts a block diagram of an example MPLS lookup table at a node. Table 400 may represent an MPLS lookup table stored in node D in the above example illustrated in FIG. 3. At node D 308, there may be three interfaces. Interface D→E, interface D→C, and interface D→B. Each interface may connect to a different node. Table 400 may comprise MPLS sub-labels for every possible edge between the nodes in the network from the perspective of node D 308 using two MPLS sub-labels. For example, node D 308 may be connected to node E 310, node B 304, and node C 306 as illustrated in FIG. 3. For the edge between node D 308 and node E 310, possible MPLS labels using sub-labels may include "DE", "EG" and "EØ". Among the three MPLS labels, labels "DE" and "EØ" may be removed using the "pop_label" operation. For the edge between node D 308 and node C 306, possible MPLS sub-labels may include "DC" and "CØ". For route 300, both MPLS labels "DC" and "CØ" may be removed using the "pop-label" operation. For the edges between node D 308 and node B 304, the possible MPLS sub-labels may include "BA" and "BØ". MPLS sub-label "BA" may be kept using the "keep_label" operation. The "keep_label" operation may refer to an operation where a label representing a next hop may be kept in the same position by swapping itself to the same label.

Figure 5:
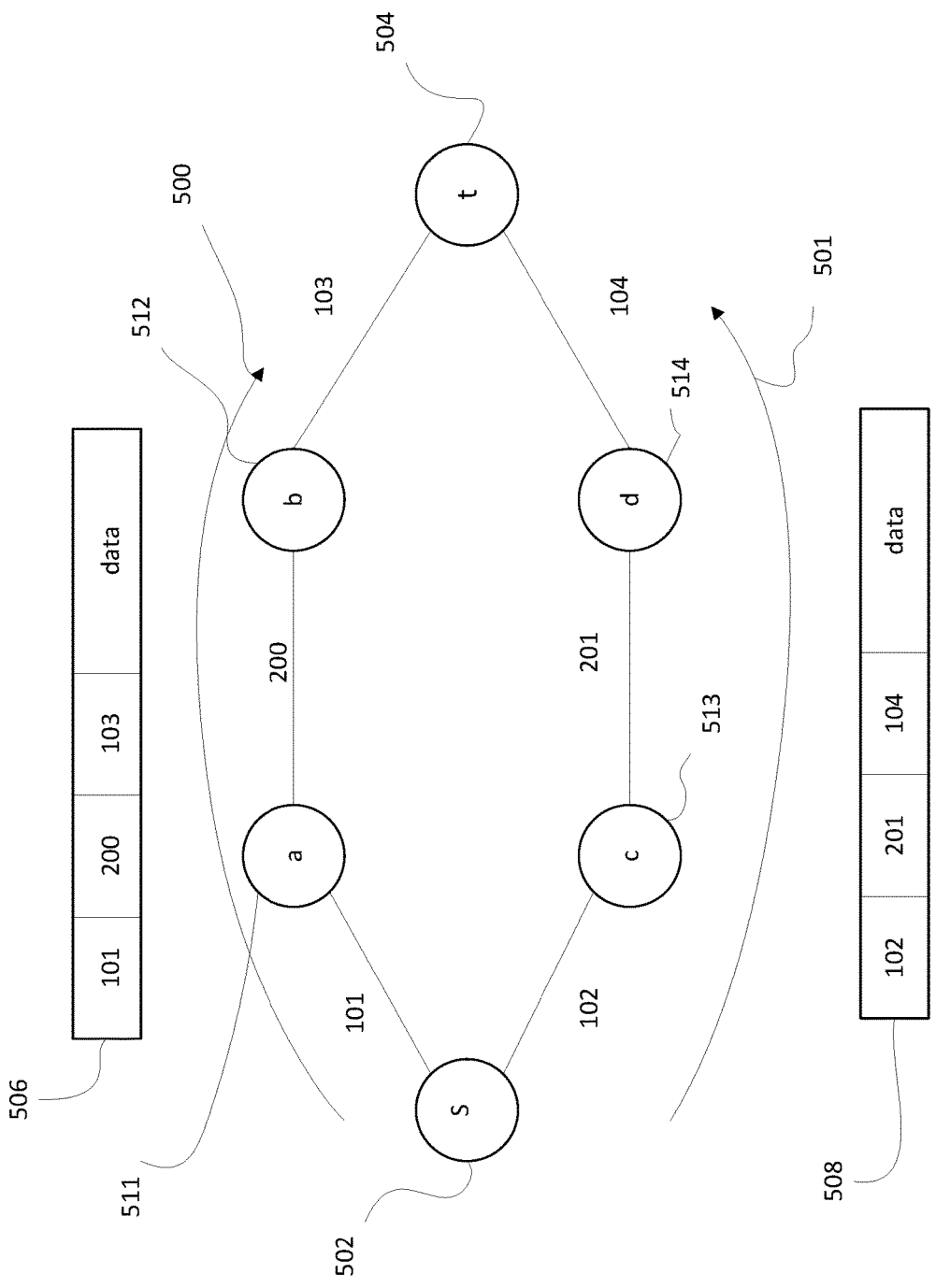
FIG. 5 depicts an example network topology illustrating a link coloring technique using full-size MPLS labels according to aspects of the disclosure.

FIG. 5 depicts a block diagram of an example network topology illustrating a link or edge coloring technique using full-size MPLS labels. Route 500 may include the edges between node s 502, node a 511, node b 512, and node t 504. Route 501 may include the edges between node s 502, node c 513, node d 514, and node t 504. The MPLS labels for route 500 may include MPLS labels 506. The MPLS labels for route 501 may include MPLS labels 508. The edge coloring technique may require assigning each edge a label unique from any other edge originating from any node that the edge is connected to. For example, edge 101 and edge 102 may be given different labels even though the originating node is node s 502. The edge between node b 512 and node t 503 and the edge between node d 514 and node t 504 may be given different labels, 103 and 104 respectively. Route 500 may be expressed using the above labels, 101-200-103. Route 501 may be expressed using labels 102-201-104.

Figure 6:
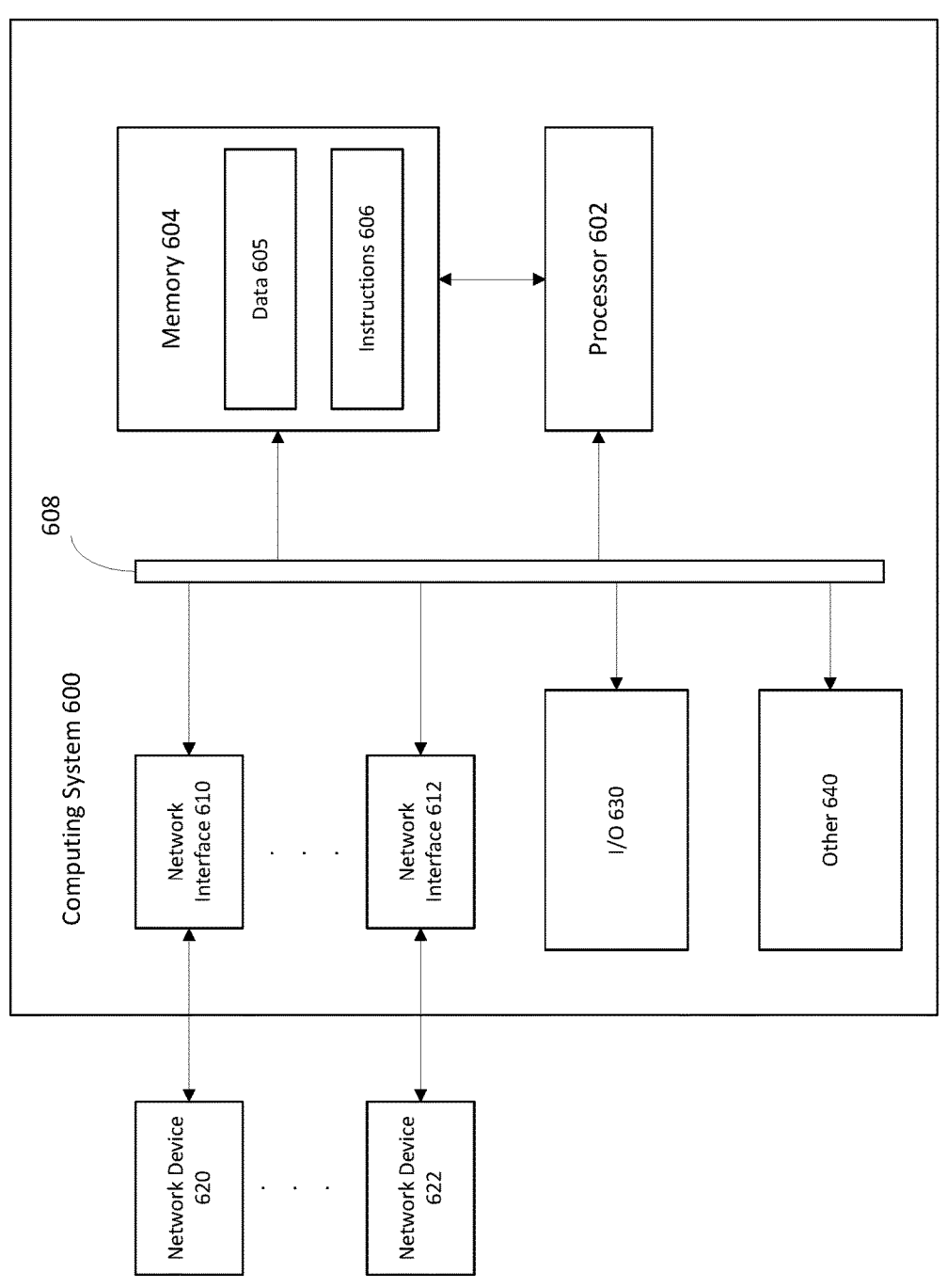
FIG. 6 depicts a block diagram of an example computing system for encoding MPLS sub-labels according to the aspects of the disclosure.

FIG. 6 depicts a flow diagram of an example computing system for encoding MPLS sub-labels. Computing system 600 may include processor 602 and memory 604. Memory 604 can store information accessible by processor 602 including instructions 606 that can be executed by processor 602. Memory 604 may also include data 605 that can be retrieved, manipulated, or stored by processor 602. Memory 604 may be a type of non-transitory computer-readable medium capable of storing information accessible by processor 602, such as volatile and non-volatile memory. Processor 602 can include one or more central processing units (CPUs), graphic processing units (GPUs), field-programmable gate arrays (FPGAs), and/or application-specific integrated circuits (ASICs), such as tensor processing units (TPUs).

Instructions 606 can include one or more instructions that when executed by processor 602, causes one or more processors to perform actions defined by the instructions. Instructions 606 can be stored in object code format for direct processing by the processor 602, or in other formats including interpretable scripts or collections of independent source code modules that are interpreted on demand or compiled in advance. Instructions 606 can include instructions for implementing processes consistent with aspects of this disclosure. Such processes can be executed using processor 602, and/or using other processors remotely located from the computing system 600.

Data 605 can be retrieved, stored, or modified by processor 602 by instructions 606. Data 605 can be stored in computer registers, in a relational or non-relational database as a table having a plurality of different fields and records, or as JSON, YAML, proto, or XML documents. Data 605 can also be formatted in a computer-readable format such as, but not limited to, binary values, ASCII, or Unicode. Moreover, data 605 can include information sufficient to identify relevant information, such as numbers, descriptive text, proprietary codes, pointers, references to data stored in other memories, including other network locations, or information that is used by a function to calculate relevant data.

Memory 604 and processor 602 may communicate with network interfaces 610-612 via bus 608. Each network interface 610-612 may be connected to network devices 620-622. Network interfaces 610-612 may be connection points for physical network links. Computing system 600 may exchange data with network devices 620-622 via physical or wireless links to network interfaces 610-612. Network devices 620-622 may include any type of network device or computing device with network functionality including a switch or a router.

Processor 602 may be configured to communicate with I/O 630 to display at least a portion of the received data on a display implemented as part of the user output. I/O 630 may include one or more speakers, transducers, or other audio outputs, a haptic interface, or other tactile feedback that provides non-visual and non-audible information to the platform user of computing system 600. I/O 630 may also include any appropriate mechanism or technique for receiving input from a user, such as a keyboard, mouse, mechanical actuators, soft actuators, touchscreens, microphones, and sensors. Other 640 may include other devices such as accelerators or external serial device ports.

Figure 7:
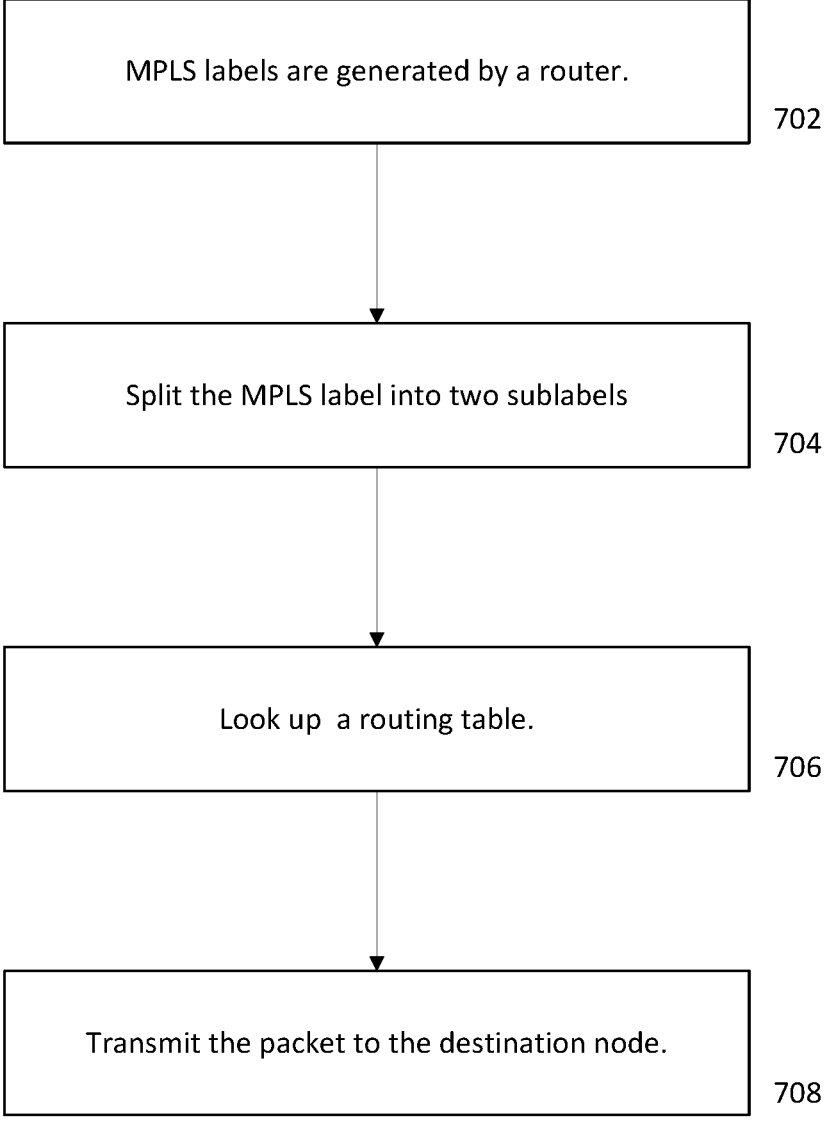
FIG. 7 depicts a flow diagram of an example method for encoding MPLS sub-labels according to the aspect of the disclosure.

FIG. 7 depicts a flow diagram of an example method for encoding MPLS sub-labels. According to block 702, MPLS labels may be generated by a router. A 4 byte-long MPLS header may comprise a 20 bits-long MPLS label, and 12 bits reserved for other bookkeeping and functions such as stack bits, TTL bits and experimental bits. Each router may generate valid MPLS labels by identifying its neighbors and generating all possible edge pairs it may identify. The router may then program the identified information into a forwarding table.

According to block 704, the MPLS label is split into at least two sub-labels by the routers. Each sub-label may comprise 10 bits of an MPLS label. Each sub-label may represent an edge in the network and the combination of two sub-labels may represent a unique pair of two edges in the network.

According to block 706, routers look up the routing tables at each node. As a packet traverses through each edge and arrives at a router, the router looks up the routing table generated or pre-populated by a control plane or any other type of pre-configuration mechanisms that assigns the MPLS labels.

According to block 708, the packet is transmitted to the destination node. The packet follows the order represented by the MPLS labels until the packet reaches the destination node.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Although the technology herein has been described with reference to particular examples, it is to be understood that these examples are merely illustrative of the principles and applications of the present technology. It is therefore to be understood that numerous modifications may be made and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for encoding source routes using multiprotocol label switching (MPLS) sub-labels, the method comprising:
dividing, by one or more processors, a memory segment of a packet corresponding to an MPLS label in an MPLS header into at least a first sub-segment and a second sub-segment;
storing, by the one or more processors, first information for a first edge of a route in the first sub-segment and second information for a second edge of the route in the second sub-segment, padding the second sub-segment with zeros when only a subset of the second sub-segment is required.

2. The method of 1, wherein the MPLS label in the MPLS header is divided into N numbers of sub-segments.

3. The method of 2, wherein the N numbers of sub-segments store information of N numbers of edges in the route.

4. The method of 1, further comprising:
receiving, by the one or more processors, the packet including the MPLS header; and
transmitting, by the one or more processors, the packet from a source node to a destination node based on a combination of the information stored in the first sub-segment and the information stored in the second sub-segment.

5. The method of 1, further comprising:
assigning an identifier for each of one or more edges that is unique from any other edge originating from a node within a N degree of neighbors.

6. The method of 1, further comprising:
distributing a combination of the first information stored in the first sub-segment and the second information stored in the second sub-segment using an intermediate system to intermediate system (IS-IS) protocol.

7. The method of 1, wherein the first information and the second information is programmed using an application programming interface (API) with a remote call procedure call (RPC)-based protocol.

8. The method of 1, wherein each of the first sub-segment and the second sub-segment store 10 bits of information.

9. The method of 8, wherein each 10-bit sub-labels may encode a link ID as distributed by a link-state protocol.

10. A system comprising:
one or more processors;
memory in communication with the one or more processors, wherein the memory contains instructions configured to cause the one or more processors to:
divide a memory segment of a packet corresponding to an MPLS label in an MPLS header into at least a first sub-segment and a second sub-segment; and
store first information for a first edge of a route in the first sub-segment and second information for a second edge of the route in the second sub-segment, wherein the instructions are further configured to cause the one or more processors to pad the second sub-segment with zeros when only a subset of the second sub-segment is required.

11. The system of 10, wherein the MPLS label in the MPLS header is divided into N numbers of sub-segments.

12. The system of 11, wherein the N numbers of sub-segments store information of N numbers of edges in the route.

13. The system of 10, wherein the instructions are further configured to cause the one or more processors to:
receive the packet including the MPLS header; and
transmit the packet from a source node to a destination node based on a combination of the information stored in the first sub-segment and the information stored in the second sub-segment.

14. The system of 10, wherein the instructions are further configured to cause the one or more processors to assign an identifier for each of one or more edges that is unique from any other edge originating from a node within a N degree of neighbors.

15. The system of 10, wherein the instructions are further configured to cause the one or more processors to distribute the combination of the first information stored in the first sub-segment and the second information stored in the second sub-segment using an intermediate system to intermediate system (IS-IS) protocol.

16. The system of 10, wherein the first information and the second information is programmed using an application programming interface (API) with a remote call procedure call (RPC) based protocol.

17. The system of 10, wherein each of the first sub-segment and the second sub-segment store 10 bits of information.

18. The system of 17, wherein each 10-bit sub-labels may encode a link ID as distributed by a link-state protocol.

* * * * *